May 19, 1925.
C. OFFENHAUSER
1,538,210
APPARATUS FOR COOKING AND PRESSING
Filed Dec. 19, 1923    2 Sheets-Sheet 1
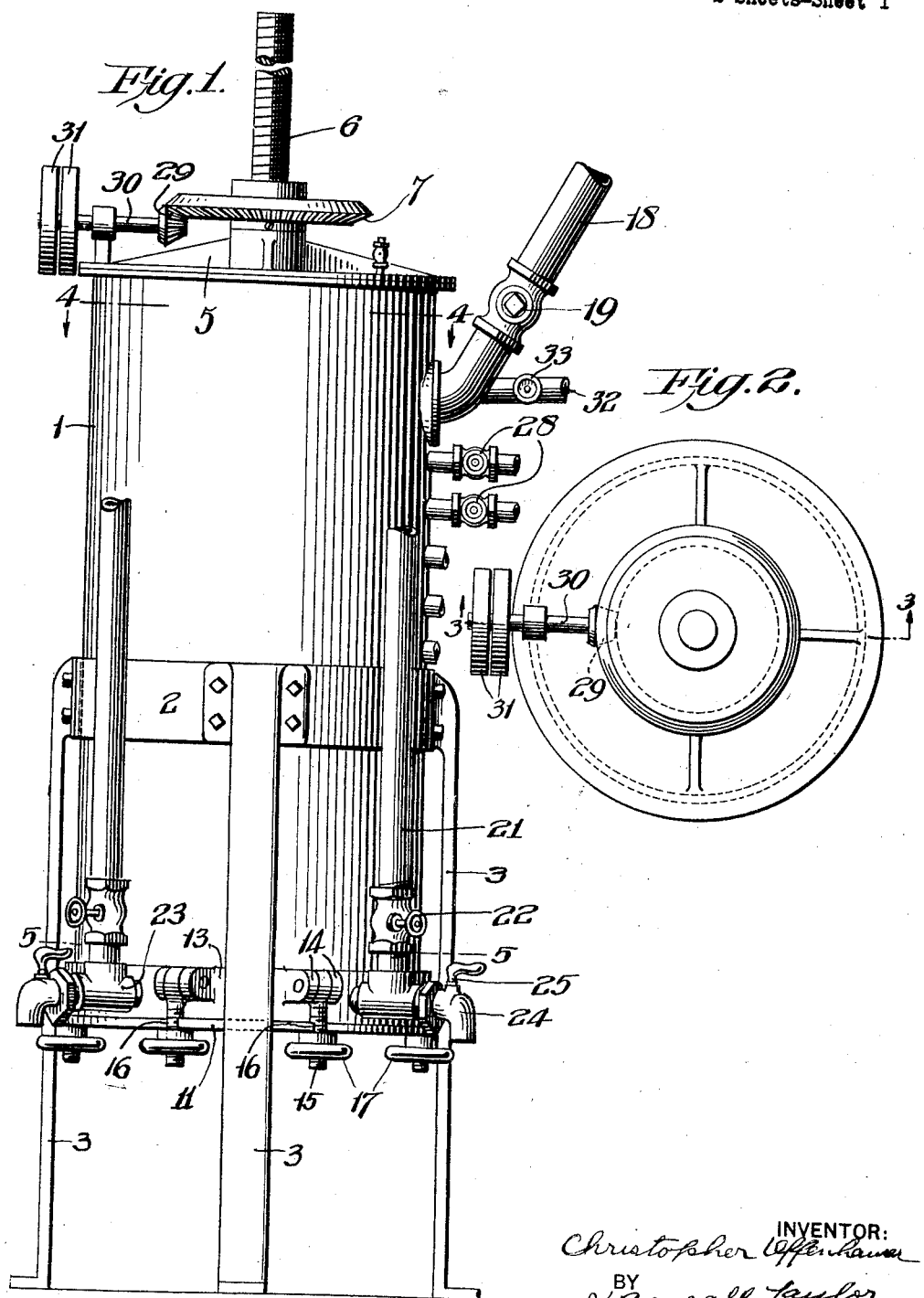

May 19, 1925.  
C. OFFENHAUSER  
1,538,210  
APPARATUS FOR COOKING AND PRESSING  
Filed Dec. 19, 1923　2 Sheets-Sheet 2
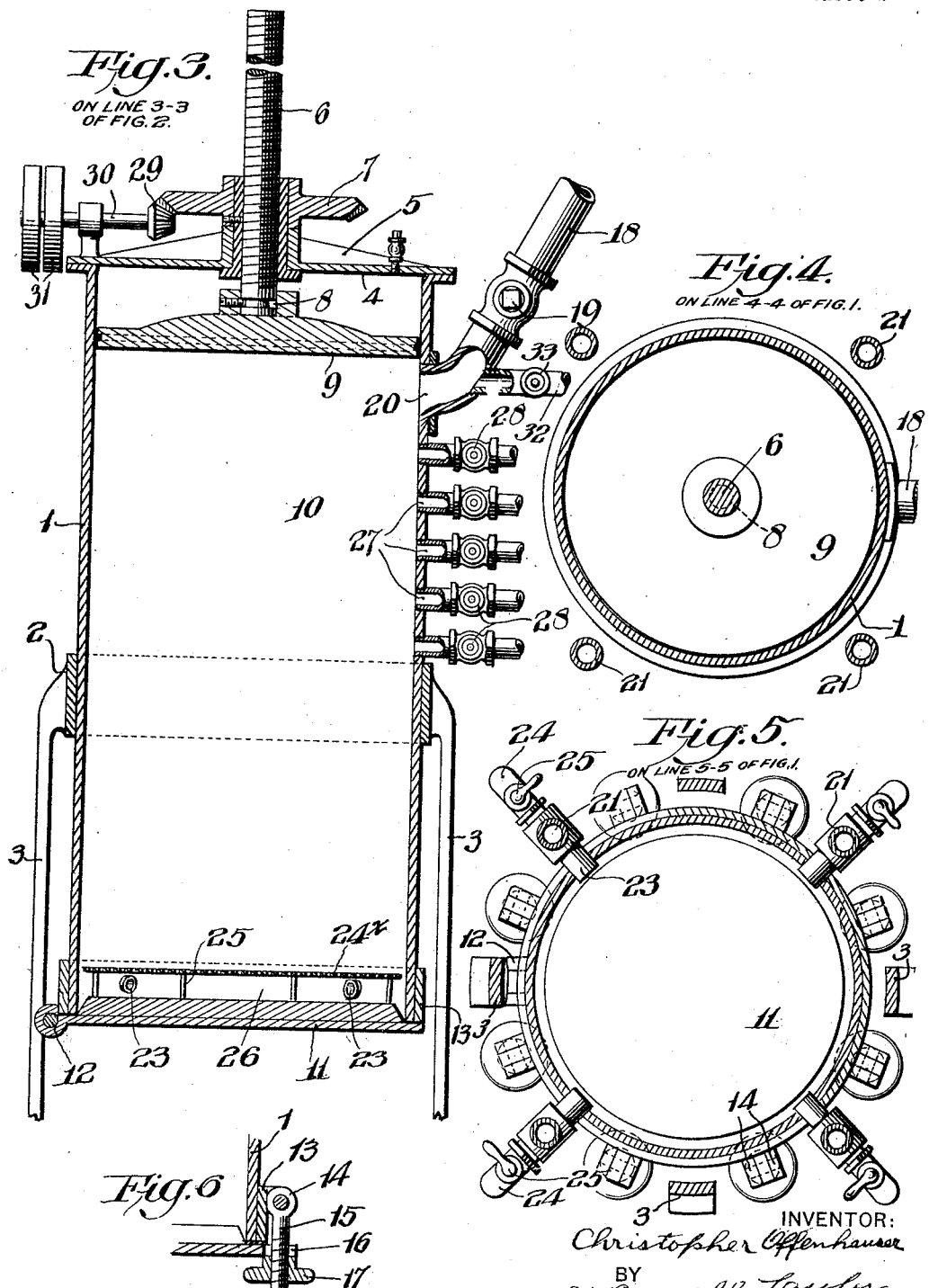

Patented May 19, 1925.

1,538,210

UNITED STATES PATENT OFFICE.

CHRISTOPHER OFFENHAUSER, OF PHILADELPHIA, PENNSYLVANIA.

APPARATUS FOR COOKING AND PRESSING.

Application filed December 19, 1923. Serial No. 681,547.

*To all whom it may concern:*

Be it known that I, CHRISTOPHER OFFENHAUSER, a citizen of the United States, residing at Philadelphia, county of Philadelphia, State of Pennsylvania, have invented a new and useful Apparatus for Cooking and Pressing, of which the following is a specification.

My present invention comprehends a novel method of and apparatus for cooking and pressing and is especially adapted to be employed in the manufacture of fertilizer, although, as is apparent, it is not limited to such use.

In the devices heretofore employed for this purpose, it has been deemed necessary to first place the material to be cooked in a digester in which it is subjected to the action of steam in order to effect the cooking operation. The material is then placed in a press and subjected to pressure, and, after the extracted oil has been drawn off, the pressed material is then removed and further treated in a dryer of any desired or conventional type.

In accordance with my present invention, I dispense with the necessity of employing a digester, and employ a novel construction and arrangement of a combined cooker and press.

It further comprehends a novel method of cooking and pressing wherein the uncooked material is placed in the pressing chamber of a press and subjected to the action of steam until the desired cooking action has been completed; the oil which rises to the surface is then drawn off, and pressure is subjected to the material to extract the water. The bottom of the press is then opened and the press plunger is advanced to effect the discharge of the material from the press.

Other novel features of construction and advantages will hereinafter more clearly appear in the detailed description and the appended claims.

For the purpose of illustrating the invention, I have shown the accompanying drawings a typical embodiment of it, which, in practice, will give reliable and satisfactory results. It is however to be understood that this embodiment is typical only, and that the various instrumentalities of which my invention consists can be variously arranged and organized, and that the invention is not limited to the precise arrangement and organization of these instrumentalities as herein set forth.

Figure 1 represents in side elevation a combined cooker and press embodying my invention, and by the employment of which my novel method can be carried out in practice.

Figure 2 represents a top plan view.

Figure 3 represents a section on line 3—3 of Figure 2.

Figure 4 represents a section on line 4—4 of Figure 1.

Figure 5 represents a section on line 5—5 of Figure 1.

Figure 6 represents a fragmentary section showing a detail of the bottom locking mechanism.

Similar numerals of reference indicate corresponding parts.

Referring to the drawings:—

1 designates the casing or press cylinder of a combined cooker and press embodying my invention. The press cylinder is supported in any desired or conventional manner, and, as illustrated, it is provided with a reinforcing band 2 secured to the cylinder in any desired manner, and to this band is connected the supporting legs or standards 3. The upper end of the cylinder is provided with a closure 4, secured thereto in any desired manner, and connected with the closure is a spider 5 the collar of which is internally threaded to receive a screw 6 which is driven by a gear 7. The screw 6 is connected, preferably by means of a swivel joint 8, with an imperforate press plunger or head 9 which has a close working fit in the chamber 10 of the press cylinder 1. The lower end of the press cylinder 1 is provided with a removable bottom 11, which for purpose of illustration, is shown as being hinged at 12 to the press cylinder, which latter is provided with a desired number of fastening devices. As illustrated, the lower end of the cylinder is reinforced by a band 13 having the lugs 14, to which are pivoted the threaded rods 15 which are adapted to pass into the recesses 16 in the bottom 11. The threaded rods 15 receive the nuts 17 so that the bottom 11 can be locked in position, and, when desired, it can be unlocked so that it will be permitted to swing downwardly to provide an unrestricted opening at the lower end of the press cylinder.

The material to be treated is introduced, into the press through the conduit 18 which is provided with a controlling valve 19.

This conduit 18 communicates, as at 20, with the chamber 10 near the upper end of the press cylinder. 21 designate a desired number of steam conduits, each of which is provided with a controlling valve 22, and each conduit 21 communicates with a pipe 23 which opens into the lower portion of the cooking and press chamber 10. The pipes 23 also communicate with discharge pipes 24, each of which is provided with a controlling valve 25. It will be understood from Figure 3 that the steam pipes 23 open into the press cylinder chamber 10 beneath a false bottom 24$^x$, which is preferably perforated, and connected with the bottom 11, by means of the fastening devices 25, which serve as spacing members, and thus provide a chamber 26 beneath the false bottom 24$^x$, so that the requisite supply of steam will always be present at the lower end of the chamber 10 during the cooking operation.

In order to draw off the oil which is extracted from the material, I provide a desired number of superimposed discharge conduits 27, each of which is provided with its controlling valve 28.

The screw 6 may be operated in any desired manner and since, in practice, it is customary to employ a power feed, the gear 7 is shown as meshing with a driving gear 29, mounted on a driving shaft 30, suitable journalled and provided with pulleys 31 in order to adapt it to be driven by any desired type of power.

Assuming that the plunger or press head 9 is in its raised position above the inlet 20, the valve 19 is opened and the uncooked material to be treated passes through the conduit 18 into the chamber 10. The valve 19 is then closed. The valves 22 are then opened and remain open until the desired amount of steam has entered beneath the bottom 24$^x$ into the chamber 26, and this steam passes upwardly through the false bottom and the material in the chamber 10, thus cooking the material. The oil or grease contained in the material is extracted, rises to the top, and is drawn off through the pipes 27 which lead to a suitable container which is to receive the oil. The driving shaft 30 is then actuated to effect the forward movement of the press head 9, and the material is compressed to extract the water therefrom. The steam valves 22 are closed and the valves 25 are opened, so that the water extracted can pass through the pipes 24 to a desired point of discharge.

As soon as the water has been extracted, the nuts 17 are loosened and the threaded rods 15 are moved outwardly to permit the bottom 11 to drop and leave an unrestricted opening at the lower end of the press cylinder. The press head 9 is then advanced to cause the discharge of the material from the press cylinder into buckets or trucks, in which it is conveyed to the dryer and dryed in the usual manner.

In the manufacture of fertilizer, it is difficult to maintain the plant in a sanitary condition, and it is also difficult to prevent the escape of obnoxious odors.

In the method heretofore employed and now in common use, it has been deemed necessary to cook the material in a digester, and it was then necessary for the workmen to remove the cooked material and place it in a press to extract the oil and the rest of the water. It is then customary to remove the material from the press and place it in a dryer to remove the greater portion of the remaining moisture. In accordance with my present invention, it is not necessary for the workmen to handle the material since it is compressed in the same chamber within which it is cooked.

I preferably employ a vent pipe 32, which is provided with a controlling valve 33. This pipe leads to a desired point of discharge of the obnoxious odor, and during the cooking operation the valve 33 is preferably open.

It will now be apparent that I have illustrated and described a new and useful method of and apparatus for cooking and pressing which embodies the features of advantage enumerated as desirable in the statement of the invention and the above description, and while I have, in the present instance, shown and described a preferred embodiment, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a combined cooker and press, a casing having its bore of uniform diameter and its lower end open, a removable closure for the lower end of said casing, a perforated false bottom secured to and spaced from said closure and of less diameter than that of said bore to form a steam receiving chamber with an annular outlet, valve controlled steam pipes communicating with said chamber, valve controlled discharge pipes communicating with said steam pipes, a plunger to compress the material and eject it through said open end, and a controllable conduit to introduce the material to be treated into said casing.

2. In a combined cooker and press, a casing having its bore of uniform diameter and its lower end open, a removable closure for the lower end of said casing a perforated false bottom secured to and spaced from said closure and of less diameter than that of said bore to form a steam receiving chamber with an annular outlet, valve controlled steam pipes communicating with said chamber, valve controlled discharge pipes communicating with said casing, a plunger to compress the material and eject it through said open end, a controllable conduit to introduce the material to be treated into said casing, and a controllable vent communicating with said conduit.

CHRISTOPHER OFFENHAUSER.